Figure 1:
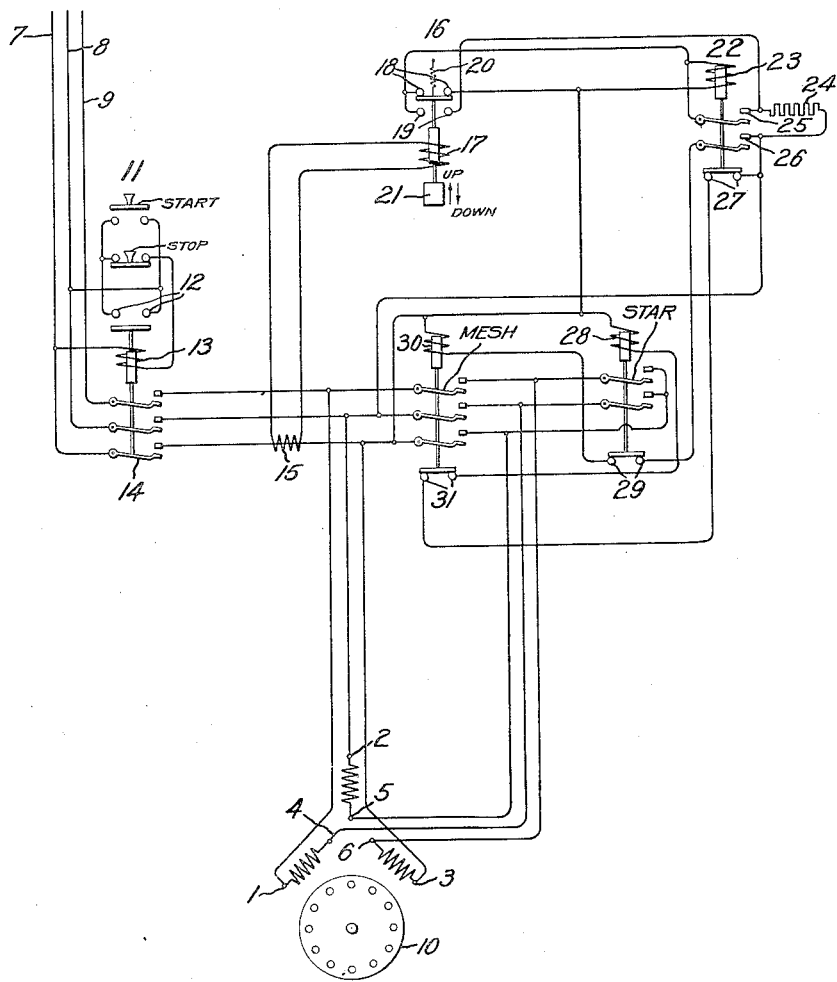

March 21, 1933.   H. M. HOBART ET AL   1,902,444
METHOD OF OPERATING POLYPHASE ALTERNATING CURRENT MOTORS
Filed July 19, 1929   2 Sheets-Sheet 2

Inventors:
Henry M. Hobart,
Frederick O. Stebbins,
Arthur F. Gettelman,
by Charles E. Mullow
Their Attorney.

Patented Mar. 21, 1933

1,902,444

UNITED STATES PATENT OFFICE

HENRY M. HOBART, OF NISKAYUNA, FREDERICK O. STEBBINS, OF SCHENECTADY, NEW YORK, AND ARTHUR F. GETTELMAN, OF DULUTH, MINNESOTA, ASSIGNORS TO GENERAL ELECTRIC COMPANY, A CORPORATION OF NEW YORK

METHOD OF OPERATING POLYPHASE ALTERNATING CURRENT MOTORS

Application filed July 19, 1929. Serial No. 379,528.

Our invention relates to polyphase alternating current motor operating systems and its principal object is to provide a simple and novel method of operation whereby the operating characteristics of such motors over their load ranges will be improved in the usual commercial applications of such motors. Another object of our invention is to so apportion the windings of the stator of such motors that when the impressed volts per turn at and above a certain predetermined load are increased above the usually accepted value the load rating of the motor for a given physical size will be increased without too greatly trespassing on its saturation and temperature limits and at the same time there will be maintained a conservative margin between such increased load rating and the motor stalling load. A further object of our invention is to provide apparatus for automatically carrying out the above method of motor operation, this apparatus being adapted to automatically increase the volts per turn impressed on the motor primary winding when its load exceeds a predetermined value.

The following theoretical discussion of alternating current motors in general and induction motors in particular is well known to those skilled in the art and will be of assistance in understanding the necessities for and the advantages of our invention. In the design of alternating current motors in general and induction motors in particular, limitations are encountered as regards stalling load, starting torque and starting current, and in order to reach the most satisfactory compromise among these limitations it becomes necessary to limit the magnetic saturation of the motor. As a result of this compromise the standard motor with its constant impressed volts per turn of its primary winding over its entire range of load has not only a low efficiency at light loads but a low power factor as well. Underloaded motors will not only cause the transmission system to have a decreased power factor but a lower efficiency as well, due to increased line losses caused by increased line current for a given kilowatt output, and in addition this decreases the kilowatt output of the supply generator for a given current. By operating a standard motor with a high magnetic saturation the starting torque and horse power rating can be considerably increased, at the same time maintaining a conservative margin between such increased rating and the stalling load and yet not materially lowering the power factor and efficiency at high loads and overloads, but such operation will result in a much lower power factor and efficiency at light loads. Also, by operating a standard motor with a low magnetic saturation the power factor and efficiency at light loads can be considerably increased but the horse power rating and stalling load will be considerably decreased and in addition the efficiency and power factor at high loads and overloads will be considerably decreased. It is evident that by operating the motor with a high magnetic saturation at high loads and overloads and a low magnetic saturation at light loads the best operating characteristics over the entire load range can be procured and in addition improve the efficiency and power factor of the transmission system. These highly desirable results our invention accomplishes by providing the stator of the motor with approximately 82% of the number of turns usually employed in a standard motor, and connecting the stator windings in mesh for high loads and overloads, thus impressing approximately 22% more volts per turn than is usually employed in a standard motor which results in a high magnetic saturation; and when the load is reduced to about 2/3 of its rating, or to any predetermined value, the stator windings are reconnected in star, thus impressing approximately 30% less volts per turn than is usually employed in a standard motor which results in a low magnetic saturation.

The maximum efficiency of a motor occurs when the constant losses equal the variable losses and as the constant losses will increase with an increased impressed voltage per turn and the variable losses will increase with an increased load, therefore to obtain the maximum efficiency at any particular load it is necessary to vary the impressed volts per turn till the constant losses equal the variable losses, thus giving an ideal voltage for each particular load. It is evident that to obtain the maximum operating efficiency over the load range of a motor with a variable load it would be necessary to continually vary the impressed volts per turn as disclosed in United States Patent No. 762,738, granted to Hans S. Meyer. In this patent a centrifugal governor on the motor shaft is employed to vary the taps of a transformer supplying power to the stator of the motor. As the load increases the motor speed decreases causing the centrifugal governor to increase the voltage supplied to the motor.

On the basis of extensive experience and data we are convinced that such constantly varying impressed volts per turn is unnecessary and though three or four different impressed volts per turn might be desirable in special cases, yet in the vast majority of commercial uses two different impressed volts per turn will substantially accomplish the improved operating characteristics that can be obtained with a continually varying impressed volts per turn. As compared to other schemes proposed to solve such problems of power factor and efficiency our invention is comparatively simple, inexpensive and economical.

Our invention will be best understood from the following description taken in connection with the accompanying drawings, while the features of our invention which are believed to be novel and patentable are pointed out in the claims appended hereto.

Fig. 1 represents a diagram of the connections of a three-phase squirrel cage induction motor embodying our invention with a load responsive mechanism for automatically changing the stator windings from mesh to star and vice versa.

Figure 2:
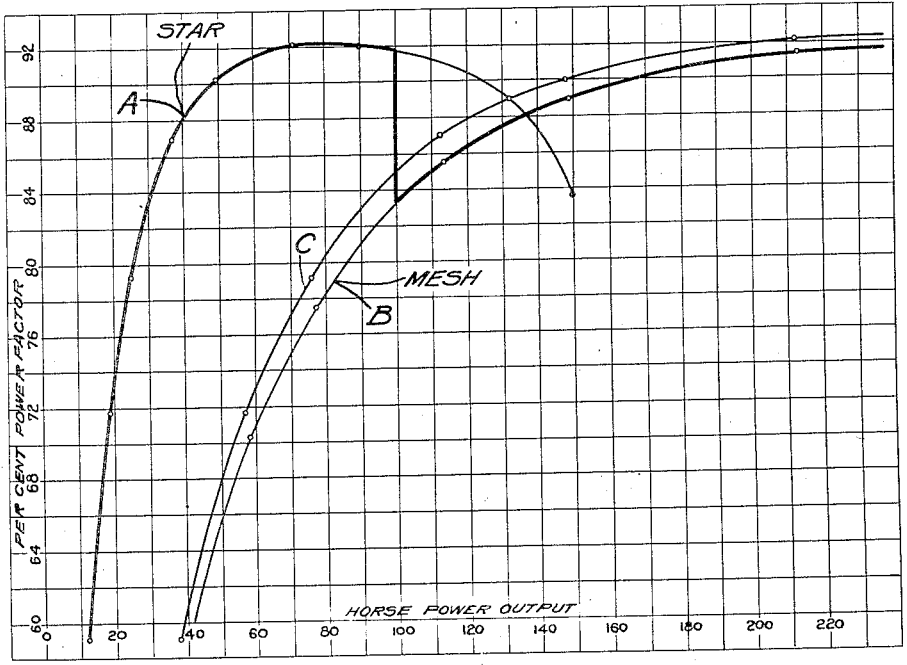

Fig. 2 represents the comparative curves of power factor plotted against horse-power output of a standard 150 horse-power, 300 R. P. M., 25 cycles, 10 poles, three-phase, squirrel cage induction motor and a 150 horse-power, 300 R. P. M., 25 cycles, 10 poles, three-phase, squirrel cage induction motor embodying our invention, curves A and B representing the latter's power factor with the stator windings connected in star and mesh respectively, while curve C represents the power factor of the standard motor. Curves A and C represent the results of actual experiments carefully conducted, whereas curve B was deduced from curve A.

Figure 3:
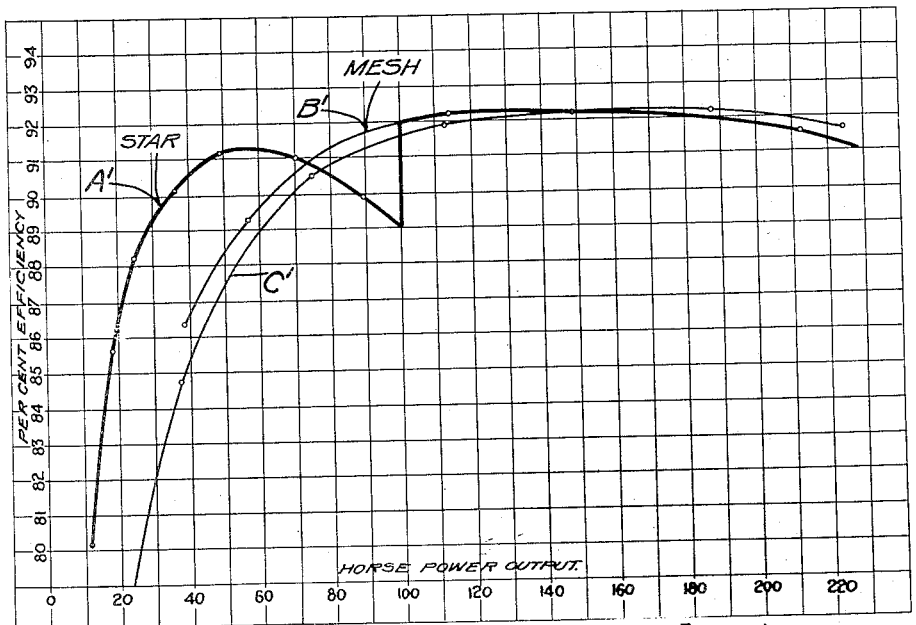

Fig. 3 represents the comparative curves of efficiency plotted against horse-power output of a standard 150 horse-power, 300 R. P. M., 25 cycles, 10 poles, three-phase, squirrel cage, induction motor and a 150 horse-power, 300 R. P. M., 25 cycles, 10 poles, three-phase, squirrel cage, induction motor embodying our invention, curves A' and B' representing the latter's efficiency with the stator windings connected in star and mesh respectively, while curve C' represents the efficiency of the standard motor. Curves A' and C' represent the results of actual experiments carefully conducted, whereas curve B' was deduced from curve A'.

In Figs. 2 and 3, curves A and B and curves A' and B' respectively are the curves of a motor which would normally be rated 100 horse-power, but which had its shaft and other mechanical parts properly proportioned for 150 horse-power rating and its stator winding provided with about 82% of the number of turns usually employed in a standard 100 horse-power motor.

Referring to Figs. 2 and 3, it can be seen that with the stator windings connected in star, thus employing about 30% less impressed volts per turn than is usually employed in a standard motor and which resulted in a low magnetic saturation, the motor embodying our invention gave a higher power factor up to 132 horse-power load and a higher efficiency up to 77 horse-power load as is evident by comparing curves A and C in Fig. 2 and curves A' and C' in Fig. 3.

Referring again to Figs. 2 and 3, it can be seen that with the stator windings connected in mesh, thus employing about 22% more impressed volts per turn than is usually employed in a standard motor and which resulted in a high magnetic saturation, the motor embodying our invention gave a slightly lower power factor over the entire load range and a higher efficiency up to 148 horse-power load as is evident by comparing curves B and C in Fig. 2 and curves B' and C' in Fig. 3.

Interpretation of the curves in Figs. 2 and 3 show that with the mesh connection we obtained at least a 50% increased rating, giving us a 150 horse-power motor, maintaining at the same time a conservative margin between this increased rating and the stalling load and not suffering any appreciable decrease in the power factor and efficiency at high loads and overloads, whereas with the star connection we obtained a considerably better power factor up to 132 horse-power load which is almost 90% of the increased rating and a better efficiency up to 77 horse-power load which is over 50% of the increased rating. It is evident that if it was desired to operate at the maximum power factor over the load range then the change-over in connections should be made at 136 horse-power load as represented by the intersections of curves A and B in Fig. 2, but in such cases the efficiency would suffer because above 73 horse-power load the efficiency of the start connection is less than that of the mesh connection. It is equally evident that if it was desired to operate at the maximum efficiency over the load range then the change-over in connections should be made at 73 horse-power load as represented by the intersections of curves A' and B' in Fig. 3, but in such case the power factor would suffer because the power factor under the star connection at 73 horse-power load is higher and continues so till 136 horse-power load is reached. But if the best combined operating characteristics of both is desired, then a compromise between the two changes described must be chosen and in the concrete example herein illustrated we selected 100 horse-power as the compromise point as represented by the heavy black lines connecting curves A and B in Fig. 2 and curves A' and B' in Fig. 3.

The advantages to the owner of a motor embodying our invention are so evident as not to require comment and the advantages to the transmission system are evident from the discussion in a preceding paragraph. Still greater improved operating characteristics should be obtained in lower speed induction motors embodying our invention because the lower the speed of a standard induction motor of a given type and rating the lower is its efficiency and power factor at light loads.

The change in the stator connections may be accomplished by hand operated switches or if desired by automatically operated switches. For illustrative purposes we have shown in Fig. 1 a load responsive automatically operated mechanism consisting of an inverse time current relay 16 to operate the control relay 22 which in turn controls the operation of the "Star" and "Mesh" switches for respectively connecting the stator windings in star or mesh, the mechanism possessing a positive interlocking feature as hereinafter described. The operation of the mechanism may be described as follows: In Fig. 1 the numbers 1 and 4, 2 and 5, 3 and 6 represent respectively the end connections of the three phases of the induction motor stator winding; 10 represents the squirrel cage secondary of the induction motor; 7, 8 and 9 represents the three phase power lines; 11 represents a remote control switch for operating the main line switch 14, this remote control switch being desirable but not essential to the operation of the mechanism or motor and as illustrated it consists of a main line switch 14 operated by a solenoid 13, a pair of holding contacts 12, a "Stop" push button which is normally closed, and a "Start" push button which is normally open; 15 represents the secondary of a current transformer to energize the solenoid 17 of the load responsive relay 16, 18 and 19 represent the low load and high load contacts respectively of the load responsive relay; 20 and 21 represent respectively an adjustable spring and dashpot for introducing a time delay in the action of the load responsive relay producing what is commonly termed an inverse time current relay, the spring also functioning to keep the low load contacts 18 closed with the motor at rest and when in operation with a load below the predetermined value; 22 represents the control relay assembly consisting of the solenoid 23, a resistance 24, a pair of holding contacts 25, and circuit closing contacts 26 and 27 in series with solenoids 30 and 28 respectively; "Star" and "Mesh" represent the switches for connecting the stator windings in star and mesh respectively; 28 and 30 represent the solenoids of the "Star" and "Mesh" switches respectively; 29 and 31 represent positive interlocking contacts for solenoids 30 and 28 respectively. The positive interlocking feature consists of the inability of the "Mesh" switch to close by operation of its solenoid 30 before the "Star" switch is opened, thereby closing contacts 29 which are in series with solenoid 30; and similarly the inability of the "Star" switch to close by the operation of its solenoid 28 before the "Mesh" switch is opened, thereby closing contacts 31 which are in series with solenoid 28, this positive interlocking feature preventing a short circuit of the power lines through a possible simultaneous closing of both switches.

With the motor at rest all the connections are as illustrated in Fig. 1 showing all circuits open. To start the motor the "Start" push button is pressed, thereby closing the circuit for solenoid 13 causing it to operate and close the main line switch 14 and the contacts 12. The "Start" push button may now be released to its normal position and the switch 14 will remain closed because the closing of the holding contacts 12 has established a holding circuit for solenoid 13. The closing of the main line switch 14 permits current to flow from line 7 through solenoid 28, through contacts 31 and 27 and back to line 8 causing solenoid 28 to operate and close the "Star" switch and the motor starts with the stator windings connected in star. The large rush of current when the motor is started tends to operate solenoid 17 in the "Down" direction and open the low load contacts 18 and close the high load contacts 19 which would cause a reconnection of the stator windings to mesh, but this undesirable result is ordinarily prevented by the time delaying feature of the inverse time current relay 16 which delays the movement of solenoid 17 permitting the necessary interval of time to elapse for the current strength to subside to its normal value for the prevailing load. The motor then continues to operate with the star connection till the load is increased to the predetermined value and if so maintained for a sufficient interval of time to overcome the time delaying action of the inverse time current relay 16, then solenoid 17 operates in the "Down" direction to open the low load contacts 18 and close the high load contacts 19 establishing a circuit from line 7 through solenoid 23, contacts 19, resistance 24 and back to line 8, thus causing solenoid 23 to operate and open contacts 27 and close contacts 25 and 26. The result of this action by the control relay 22 may be summarized as opening the circuit for solenoid 28 by the opening of the contacts 27, thus causing the "Star" switch to open; the closing of contacts 26 which together with the closing of contacts 29 caused by the opening of the "Star" switch establish a circuit for solenoid 30 from line 7 through solenoid 30, contacts 29 and 26, and back to line 8 causing it to operate and close the "Mesh" switch, thus connecting the stator windings in mesh only after the star connections had been opened which is the positive interlocking feature previously mentioned; and finally the closing of contacts 25 which establish a holding circuit for solenoid 23 from line 7 through solenoid 23, contacts 25, resistance 24 and back to line 8.

The motor then continues to operate with the stator windings connected in mesh for loads at and above this predetermined value. If the load is decreased below the predetermined value and if so maintained a sufficient interval of time to overcome the time delaying action of the inverse time current relay 16, then solenoid 17 operates in the "Up" direction and opens the high load contacts 19 and closes the low load contacts 18. The closing of contacts 18 short circuits the solenoid 23 because the current can now flow from line 7 through contacts 18 and 25, resistance 24 and back to line 8, the resistance 24 preventing a short circuit of the lines 7 and 8. The short circuiting of solenoid 23 deenergizes it causing it to open contacts 25 and 26 and close contacts 27. The result of this action by the control relay 22 may be summarized as the opening of the holding circuit for solenoid 23 by the opening of contacts 25, the opening of contacts 26 breaking the circuit for solenoid 30 causing it to open the "Mesh" switch; and finally the closing of contacts 27 which, together with the closing of contacts 31 caused by the opening of the "Mesh" switch, establishes a circuit for solenoid 28 as previously described causing it to operate and close the "Star" switch and thus reconnect the stator windings in star only after the mesh connection had been opened which is the positive interlocking feature previously mentioned. The purpose of the time delay in the action of the load responsive relay can now be readily appreciated as consisting in the prevention of the continual opening and closing of the "Star" and "Mesh" switches for only momentary fluctuations in the motor load above and below the predetermined value.

The motor then continues to operate with the stator windings connected in star until the load is increased to the predetermined value, thus causing the sequence of acts to be repeated as previously described. To shut the motor down the "Stop" push button is pressed which opens the circuit for solenoid 13 causing it to open the main line switch 14 and disconnect the motor from the lines. The "Stop" push button may now be released to return to its normal position and the switch 14 will remain open because the holding circuit for solenoid 13 through contacts 12 has been opened. The rising load and decreasing load change over points will not exactly coincide but will be so near to each other as to be entirely satisfactory for all practical purposes and if desired the two change over points can be purposely set further apart.

While we have described our invention together with specific test results in connection with a three-phase, 150 horse-power, 300 R. P. M., 25 cycles, 10 pole induction motor with a squirrel cage secondary it is evident that our invention is equally applicable to all polyphase motors whose windings may be connected in star or mesh irrespective of their rating, speed, or use in which they are employed and also irrespective of whether they have squirrel cage or wound secondaries or separately excited secondary windings and, therefore, we do not wish to limit our invention to the type herein described.

In accordance with the provisions of the patent statutes we have described the principles of operation of our invention together with the apparatus which we now consider to represent the best embodiment thereof but we desire to have it understood that such other modifications as fall fairly within the true spirit and scope of our invention are intended to be included within the scope of the appended claims.

What we claim as new and desire to secure by Letters Patent of the United States is:

1. In a motor control system, a source of alternating current, an alternating current motor having primary windings, switching means between said motor and source of supply adapted in different positions to connect the primary winding of said motor to said source so as to impose different volts per turn on such windings, and electromagnetic control means responsive to the load on said motor for controlling said switching means to increase the volts per turn on said windings as the load increases beyond a predetermined amount, said control means having a time delay action.

2. In a motor control system, a source of polyphase alternating current, a polyphase motor having primary windings, switches for connecting said windings to said source in star or in mesh, and electromagnetic control means responsive to the load on said motor for causing the operation of said switches to connect said windings in star when the load is below a predetermined amount and to connect said windings in mesh when the load is above a predetermined amount, said electromagnetic control means having a time delay action so as to be non-responsive to momentary changes in motor load.

3. In combination with a polyphase motor having primary windings adapted to be connected in star or in mesh to a suitable source of supply, an electromagnetically operated switch for making such star connection, an electromagnetically operated switch for making such mesh connection, a relay for alternately controlling the operation of said "Star" and "Mesh" switches, means preventing the closure of said "Star" switch until the "Mesh" switch is opened and vice versa, and time delay means responsive to the load on said motor for controlling the operation of said relay in such manner as to cause said motor to be connected in star at starting and up to a predetermined load and to be connected in mesh above such predetermined load.

4. In a motor control system, a constant voltage source of supply, a motor having windings to be supplied from said source, two switches between said motor and said source of supply respectively adapted to connect said windings to said source so as to impose different volts per turn on said windings, and automatic means responsive to an increase in the load on said motor above a predetermined amount for opening one of said switches and closing the other of said switches to increase the volts per turn impressed on said windings and responsive to a decrease in load below said predetermined amount to operate said switches in the reverse order to decrease the volts per turn impressed on said motor windings, said automatic means having a time delay action which prevents its operation to change the volts per turn on said motor for only momentary fluctuations in motor load above and below said predetermined value.

5. In combination, a source of electric current, an electric motor having a winding to be energized from said source, switching means between said winding and said source adapted in different positions to connect said winding to said source so that different volts per turn are impressed on said winding at the different positions of said switching means, and means responsive to the load on said motor for effecting the operation of said switching means to increase the volts per turn impressed on said winding by said source when the load on said motor exceeds a predetermined value and for effecting the operation of said switching means to decrease the volts per turn impressed on said winding by said source when the load on said motor decreases below said predetermined value.

6. In combination, a source of alternating current, a polyphase alternating current motor having a primary winding to be energized from said source, a switch for connecting said winding in star to said source, a switch for connecting said winding in mesh to said source, and means responsive to the load on said motor for closing the first mentioned switch and opening the second mentioned switch when the load on said motor is below a predetermined value and for opening the first mentioned switch and closing the second mentioned switch when the load on said motor exceeds said predetermined value.

7. In combination, a source of alternating current, a polyphase alternating current motor having a primary winding to be energized from said source, a switch for connecting said winding in star to said source, a switch for connecting said winding in mesh to said source, a relay for effecting the closing of the first mentioned switch and the opening of the second mentioned switch and vice versa, and electromagnetic means responsive to the load on said motor for operating said relay to effect the closing of the first mentioned switch and the opening of the second mentioned switch when the motor load is below a predetermined value, and for operating said relay to effect the opening of the first mentioned switch and the closing of the second mentioned switch when the motor load exceeds said predetermined value.

8. In combination, a source of alternating current, a polyphase alternating current motor containing a primary winding having approximately 82% of the number of turns that it would have if the volts per turn to be impressed on it by said source were to remain approximately constant during the entire operating load range of the motor, a switch for connecting said winding in star to said source, a switch for connecting said winding in mesh to said source, and means responsive to the load on said motor for closing the first mentioned switch and opening the second mentioned switch when the load on said motor is below a predetermined value and for opening the first mentioned switch and closing the second mentioned switch when the load on said motor exceeds said predetermined value.

9. The method of operating a polyphase alternating current motor containing a primary winding having approximately 82% of the number of turns that it would have if the volts per turn to be impressed on it by an alternating current source were to remain approximately constant during the entire operating load range of the motor, which consists in connecting the primary winding in star to a source of alternating current when starting the motor, operating the motor with its primary winding connected in star till the motor load reaches a predetermined value, reconnecting the primary winding in mesh to the source of alternating current when the motor load exceeds the predetermined value, and operating the motor with its primary winding connected in mesh for all motor loads above the predetermined value.

10. The method of operating an alternating current motor having a primary winding, which with motor loads below a predetermined value consists in impressing on the primary winding approximately 30% less volts per turn than would be impressed if the volts per turn were to remain substantially constant during the entire operating load range of the motor, and which with motor loads above the predetermined value consists in impressing on the primary winding approximately 22% more volts per turn than would be impressed if the volts per turn were to remain substantially constant during the entire operating load range of the motor.

In witness whereof, we have hereunto set our hands the 3rd day of July, 1929; the 18th day of July, 1929; and the 8th day of July, 1929, respectively.

HENRY M. HOBART.
FREDERICK O. STEBBINS.
ARTHUR F. GETTELMAN.